US008004124B2

(12) United States Patent
Kwon et al.

(10) Patent No.: US 8,004,124 B2
(45) Date of Patent: Aug. 23, 2011

(54) VIBRATION GENERATION MODULE CAPABLE OF GENERATING INERTIAL AND IMPACT VIBRATIONS

(75) Inventors: Dong Soo Kwon, Seoul (KR); Tae Heon Yang, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 100 days.

(21) Appl. No.: 12/582,782

(22) Filed: Oct. 21, 2009

(65) Prior Publication Data

US 2010/0283331 A1 Nov. 11, 2010

(30) Foreign Application Priority Data

May 7, 2009 (KR) ........................ 10-2009-0039526

(51) Int. Cl.
*H02K 33/00* (2006.01)

(52) U.S. Cl. ........................................... 310/15; 310/36

(58) Field of Classification Search .................... 310/15, 310/81, 36, 12.16
See application file for complete search history.

(56) References Cited

U.S. PATENT DOCUMENTS 5,956,622 A * 9/1999 Lee ................................ 340/7.6
6,590,991 B1 * 7/2003 Maeda ........................... 381/409
7,550,880 B1 * 6/2009 Pusl ................................ 310/15
7,619,498 B2 * 11/2009 Miura ........................... 335/222
7,652,399 B2 * 1/2010 Lee ............................. 310/67 R
7,728,705 B2 * 6/2010 Wang et al. ................... 335/229

* cited by examiner

*Primary Examiner* — Nguyen N Hanh
(74) *Attorney, Agent, or Firm* — LRK Patent Law Firm

(57) ABSTRACT

Disclosed herein is a vibration generation module capable of generating inertial and impact vibrations. The vibration generation module includes a magnetic force generation unit, an elastic force provision unit, a permanent magnet, a contactor, and an impact transmission panel. The permanent magnet is configured such that when periodic electrical energy having a specific duty or voltage is supplied to the magnetic force generation unit, the permanent magnet alternates between a position in which the permanent magnet is completely spaced apart from the magnetic force generation unit and a completely lowered position in which the permanent magnet collides with an upper surface of the magnetic force generation unit, and such that periodic electrical energy having another specific duty or voltage is supplied to the magnetic force generation unit, the permanent magnet alternates between a position in which the permanent magnet is partially spaced apart from the magnetic force generation unit and a partially lowered position in which the permanent magnet is close to the upper surface of the magnetic force generation unit.

8 Claims, 8 Drawing Sheets

VIBRATION GENERATION MODULE CAPABLE OF GENERATING INERTIAL AND IMPACT VIBRATIONS

BACKGROUND OF THE INVENTION

1. Field of the Invention

The present invention relates generally to a vibration generation module capable of generating inertial and impact vibrations, and, more particularly, to a vibration generation module capable of generating inertial and impact vibrations, which can generate impact vibrations when periodic electrical energy having a duty or voltage higher than a reference value is supplied to a magnetic force generation unit and which can generate inertial vibrations when periodic electrical energy having a duty or voltage lower than a reference value is supplied to the magnetic force generation unit, thereby generating a variety of types of vibrations.

2. Description of the Related Art

Nowadays we can easily watch making payment, watching television and accessing the Internet through mobile phones around us.

Meanwhile, since the Internet can be easily accessed regardless of location, users want to search for desired information using mobile devices, such as a PDA and a mobile phone, rather than relying on only desktop computers, anytime and anywhere.

This phenomenon shows that mankind enters the Ubiquitous Era in which information is beyond temporal and spatial limitations and exists everywhere at the same time.

The development of ubiquitous devices (or U-terminals) capable of keeping up with the ubiquitous era can be an impelling force that promotes the popularization of a social system using a ubiquitous network, that is, a networking environment that allows access to computers anytime and anywhere, and makes the market of the social system in which most of people participate to more easily appear.

Although in order to effectively transmit a variety of information, transmitted via a ubiquitous network environment, to users through mobile devices, it is necessary to use the five senses of humans, mobiles devices being used by us are chiefly dependent on the visual and auditory sensation of the five senses.

However, recently, research into technology for transmitting tactile sensation, which is one of the most important senses, as well as visual and auditory sensation has been actively conducted. Devices using tactile sensation are referred to as haptic devices.

Haptic devices are used in a variety of fields, such as virtual real, simulation, wearable computers, robotics and the medical filed, and are also called “haptic interfaces.”

Such haptic devices are classified into two types: force feedback devices capable of transmitting physical force to muscles or joints and tactile displays capable of transmitting skin stimuli such as texture, temperature, pressure, vibration and pain, through mechanoreceptors disposed under the skin.

Here, it is important that tactile displays are provided with tactile technology for implementing realistic force, such as that of the texture of an actual object, using skin stimuli.

Recently, electronic devices, such as mobile phones, can transmit not only auditory information but also visual information, as in the SKT company’s “3G+” or KTF company’s “SHOW” service. Since visual information is transmitted, users demand larger displays, so that conventional mobile phones are being replaced with mobile phones having entire front touch screens without having manipulation buttons, like “Haptic phones” and “Touch web phones.”

AS manipulation buttons provided in electronic devices are eliminated, unlike in conventional mobile phones, users manipulate mobile phones only using touch screens. As a result, a disadvantage arises in that, when users manipulate touch screens, it is difficult for the users to confirm whether they has correctly manipulated touch screens using touches, so that the rate of the erroneous operation of touch screens is increased.

In order to overcome the above-described disadvantages, an approach to a scheme in which when a touch screen is manipulated by a touch, a vibration motor is operated and generates vibrations, or a touch screen itself is vibrated has been attempted.

However, the case where when the screen is manipulated, the vibration motor is operated and generates vibrations is disadvantageous in that the sensation of vibration felt by users is not neat and it is possible to implement only a single type of vibrations, and is problematic in that erroneous manipulation may be caused because the overall mobile phone is vibrated.

Furthermore, there are problems in that the vibration of touch screens themselves during the manipulation of the screens makes users’ manipulation of mobile phones to be confused, and increases the fatigue of the eyes due to the vibration of the screens.

SUMMARY OF THE INVENTION

Accordingly, the present invention has been made keeping in mind the above problems occurring in the prior art, and an Object of the present invention is to provide a vibration generation module capable of generating inertial and impact vibrations, which can generate impact vibrations when periodic electrical energy having a duty or voltage higher than a reference value is supplied to a magnetic force generation unit and which can generate inertial vibrations when periodic electrical energy having a duty or voltage lower than the reference value is supplied to the magnetic force generation unit, thereby generating a variety of types of vibrations.

In order to accomplish the above object, the present invention provides a vibration generation module capable of generating inertial and impact vibrations, including a magnetic force generation unit made of magnetic material to generate magnetic force when electrical energy is supplied from an external source; an elastic force provision unit fixedly mounted above the magnetic force generation unit, and configured to provide elastic force in a vertical direction; a permanent magnet coupled to the elastic force provision unit, and configured such that when electrical energy is not supplied to the magnetic force generation unit, the permanent magnet is lowered to a position in contact with or near an upper surface of the magnetic force generation unit by its own magnetic force, so that the elastic force provision unit enters a state of holding elastic restoring force, such that when periodic electrical energy having a duty or voltage higher than a reference value is supplied to the magnetic force generation unit, the permanent magnet alternates between a position in which the permanent magnet is completely spaced apart from the magnetic force generation unit and a completely lowered position in which the permanent magnet collides with an upper surface of the magnetic force generation unit, thereby generating impact vibrations, and such that periodic electrical energy having a duty or voltage lower than a reference value is supplied to the magnetic force generation unit, the permanent magnet alternates between a position in which the permanent magnet is partially spaced apart from the magnetic force generation unit and a partially lowered position in which the permanent magnet is close to the upper surface of the magnetic force generation unit, thereby generating inertial vibrations; a contactor fastened to one side of the permanent magnet, and configured to be selectively raised and lowered as the permanent magnet is moved; and an impact transmission panel configured to collide with a front end of the contactor and generate impact when the permanent magnet is moved to the completely raised position.

Preferably, the magnetic force generation unit is formed of a bobbinless solenoid coil, and a base plate made of magnetic material is disposed on a lower surface of the bobbinless solenoid coil.

Preferably, the base plate is provided on an upper surface thereof with a magnetic core which protrudes inside the bobbinless solenoid coil.

Preferably, the elastic force provision unit is formed of a plate shape, and has a fastening hole configured to be tightly fitted around the contactor and a slot provided around the fastening hole and configured to be elastically deformed.

Preferably, the impact transmission panel is provided on an outside surface of an electronic device.

Preferably, the magnetic force generation unit is formed of a solenoid coil.

Preferably, the magnetic force generation unit is provided on an upper surface thereof with a soundproof limiter.

Preferably, the periodic electrical energy is electrical energy the polarities of which alternate with each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be apparent from the following preferred embodiments described in conjunction with reference to the accompanying drawings. The present invention will be described through embodiments in detail so that those skilled in the art can easily understand and practice the present invention.

Figure 1:
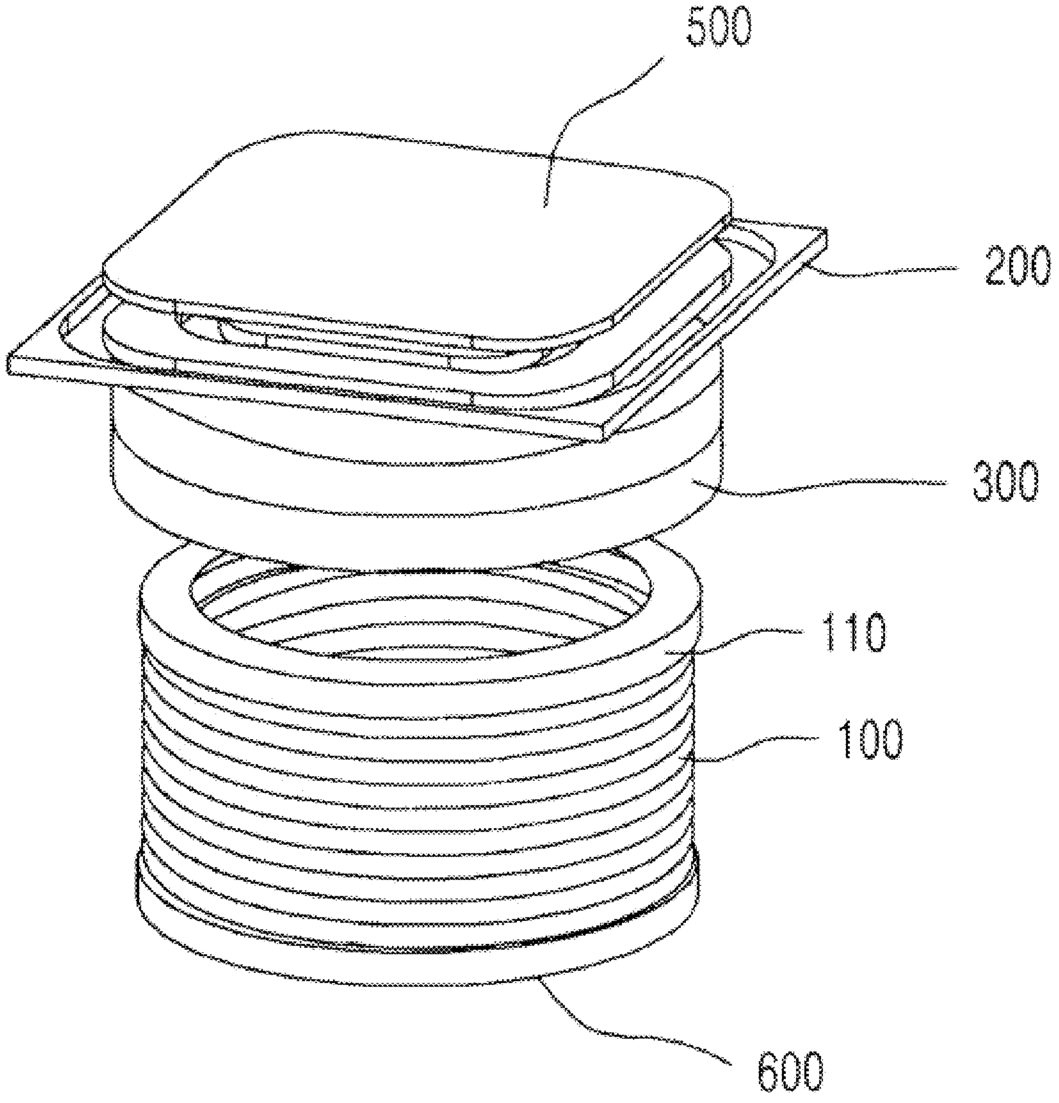
FIG. 1 is an assembled perspective view showing a vibration generation module capable of generating inertial and impact vibrations according to an embodiment of the present invention.

As shown in FIG. 1 and, a vibration generation module capable of generating inertial and impact vibrations according to an embodiment of the present invention includes a magnetic force generation unit 100, an elastic force provision unit 200, a permanent magnet 300, a contactor 400, an impact transmission panel 500, and a base plate 600.

The magnetic force generation unit 100 is an element for generating magnetic force when electrical energy is supplied from an external source, and is made of magnetic material. For example, the magnetic force generation unit 100 may be formed of a general solenoid coil 100. In the present embodiment, magnetic force generation unit 100 is formed of a bobbinless solenoid coil 100 having a hollow central portion.

The magnetic force generation unit 100 is configured such that when voltage is supplied in a forward direction, the upper part thereof becomes an S pole and the lower part thereof becomes an N pole, while when voltage is supplied in a reverse direction, the upper part thereof becomes an N pole and the lower part thereof becomes an S pole. It will be apparent that the polarities may be generated in the opposite manner.

The elastic force provision unit 200 is fixedly mounted above the magnetic force generation unit 100, and provides elastic force in a vertical direction. For example, the elastic force provision unit 200 may be fixedly mounted on a casing (not shown) in which the vibration generation module of the present embodiment is accommodated.

Figure 2:
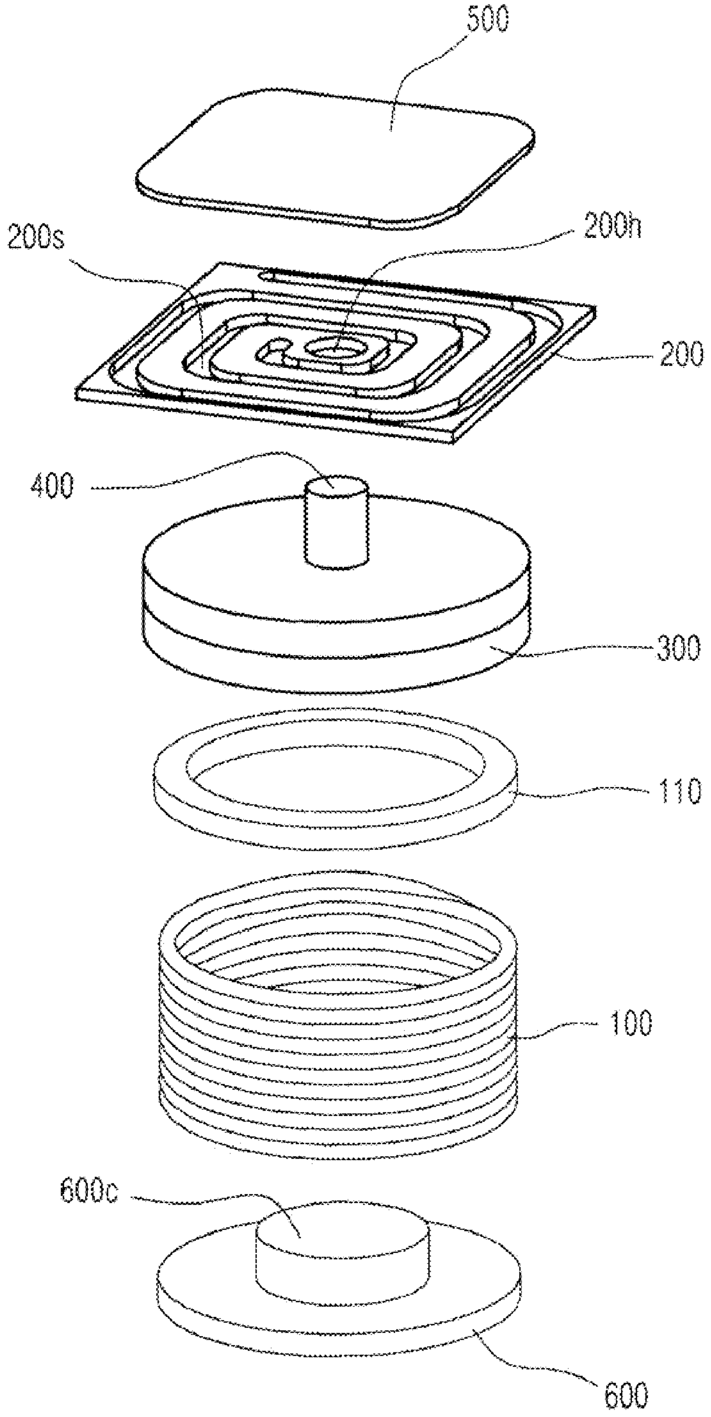
FIG. 2 is an exploded perspective view showing the vibration generation module capable of generating inertial and impact vibrations according to the embodiment of the present invention.

Here, as shown in FIG. 2, the elastic force provision unit 200 is formed in a plate shape, and has a fastening hole **200*h* configured to be tightly fitted around the contactor 400 and a slot 200*s* provided around the fastening hole 200*h* and configured to be elastically deformed. The elastic force provision unit 200 is configured to provide electric force using the slot 200*s* in a vertical direction based on the fastening hole 200*h***.

The permanent magnet 300 is configured to be connected to the elastic force provision unit 200. When electrical energy is not supplied to the magnetic force generation unit 100, the permanent magnet 300 is lowered to a position in contact with or near the upper surface of the magnetic force generation unit 100 by its own magnetic force, so that the elastic force provision unit 200 enters the state of holding elastic restoring force. In the present embodiment, the permanent magnet 300 may be configured such that the upper part thereof is an N pole and the lower part thereof is an S pole.

Figure 3:
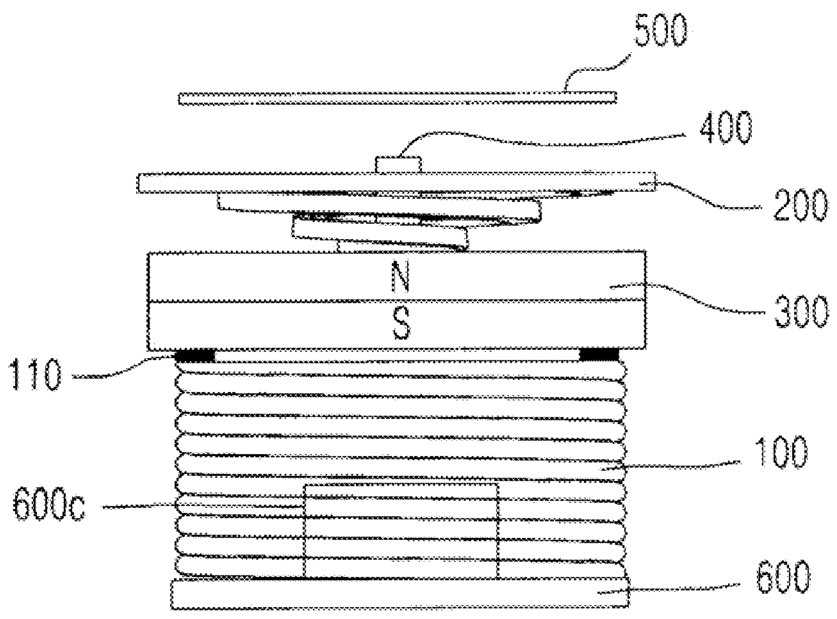
FIGS. 3 to 5 are diagrams illustrating the generation of impact vibrations by the vibration generation module capable of generating inertial and impact vibrations according to the embodiment of the present invention.
Figure 3:
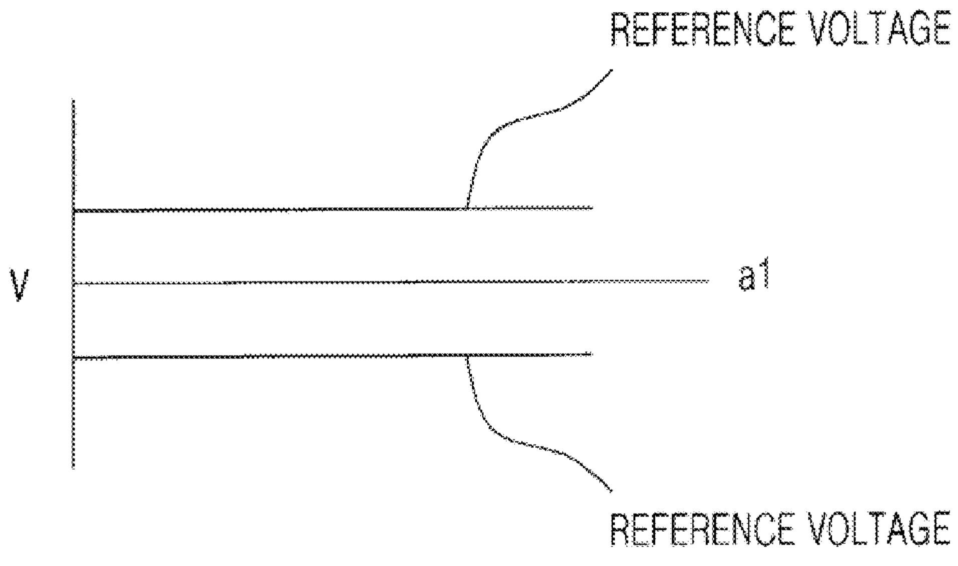

For example, as shown in FIG. 3, in the case where signal "a1" having a voltage of 0 is applied to the magnetic force generation unit 100, if the attractive force between the permanent magnet 300 and the magnetic force generation unit 100 is stronger than the elastic force of the elastic force provision unit 200, the permanent magnet 300 is moved to a position in which the permanent magnet 300 is in contact with the upper surface of the magnetic force generation unit 100. In contrast, if the attractive force between the permanent magnet 300 and the magnetic force generation unit 100 balances with the elastic force of the elastic force provision unit 200, the permanent magnet 300 is moved to a position in which the permanent magnet 300 is close to the upper surface of the magnetic force generation unit 100.

The impact vibrations of the permanent magnet 300 will be described below.

As shown in FIG. 3, in the case where the permanent magnet 300 is in contact with or near the upper part of the magnetic force generation unit 100, and when periodic electrical energy having a duty or voltage higher than a reference value is supplied to the magnetic force generation unit 100, the permanent magnet 300 alternates between a completely raised position in which the permanent magnet 300 is completely spaced apart from the magnetic force generation unit 100 and a completely lowered position in which the permanent magnet 300 is in contact with the upper surface of the magnetic force generation unit 100, thereby generating impact vibrations.

Figure 4:
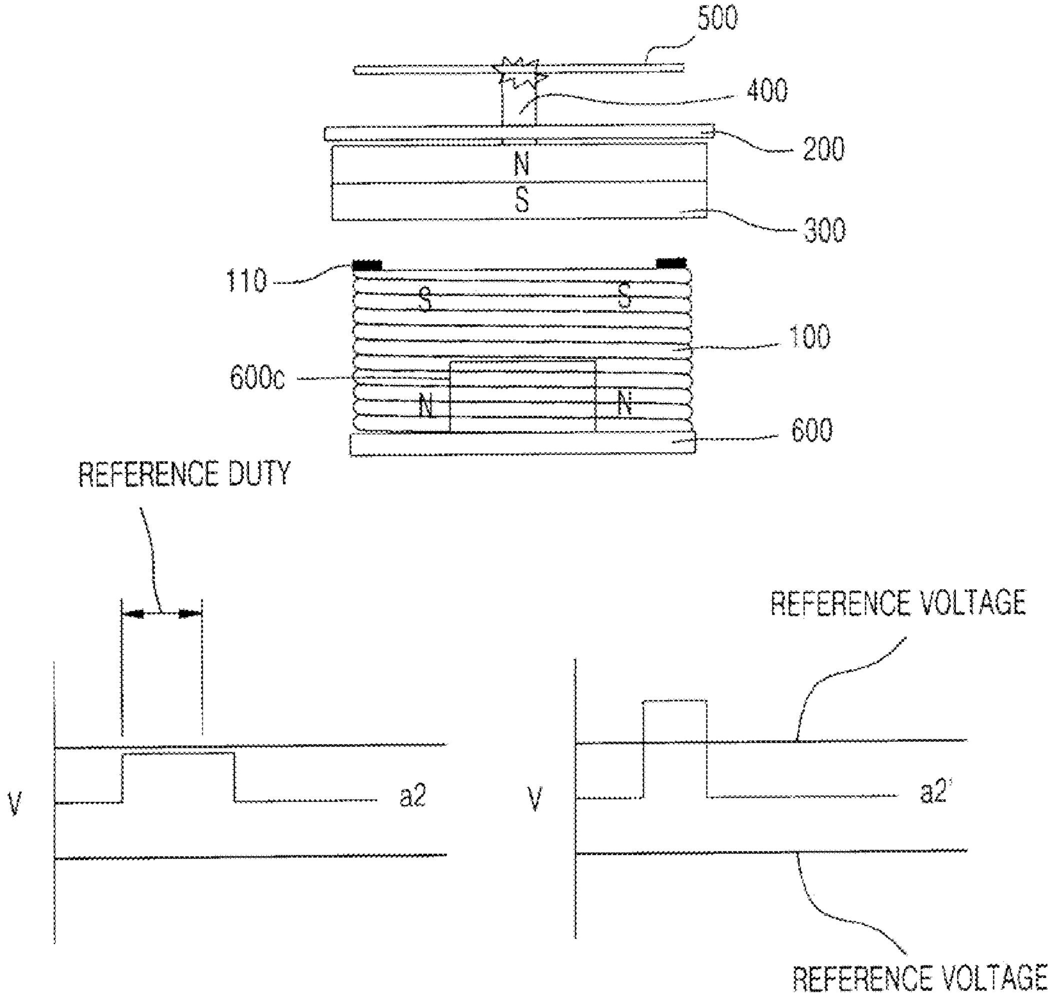

That is, as shown in FIG. 4, when periodic electrical energy a2 having a duty higher than a reference value or periodic electrical energy a2' having a voltage higher than a reference value is supplied in a forward direction, the upper part of the magnetic force generation unit 100 becomes an S pole and the lower part thereof becomes an N pole. Accordingly, the permanent magnet 300 is completely spaced apart from the magnetic force generation unit 100 and moved to the completely raised position by repulsive force generated in conjunction with the magnetic force generation unit 100 and the elastic restoring force generated by the elastic force provision unit 200.

Figure 5:
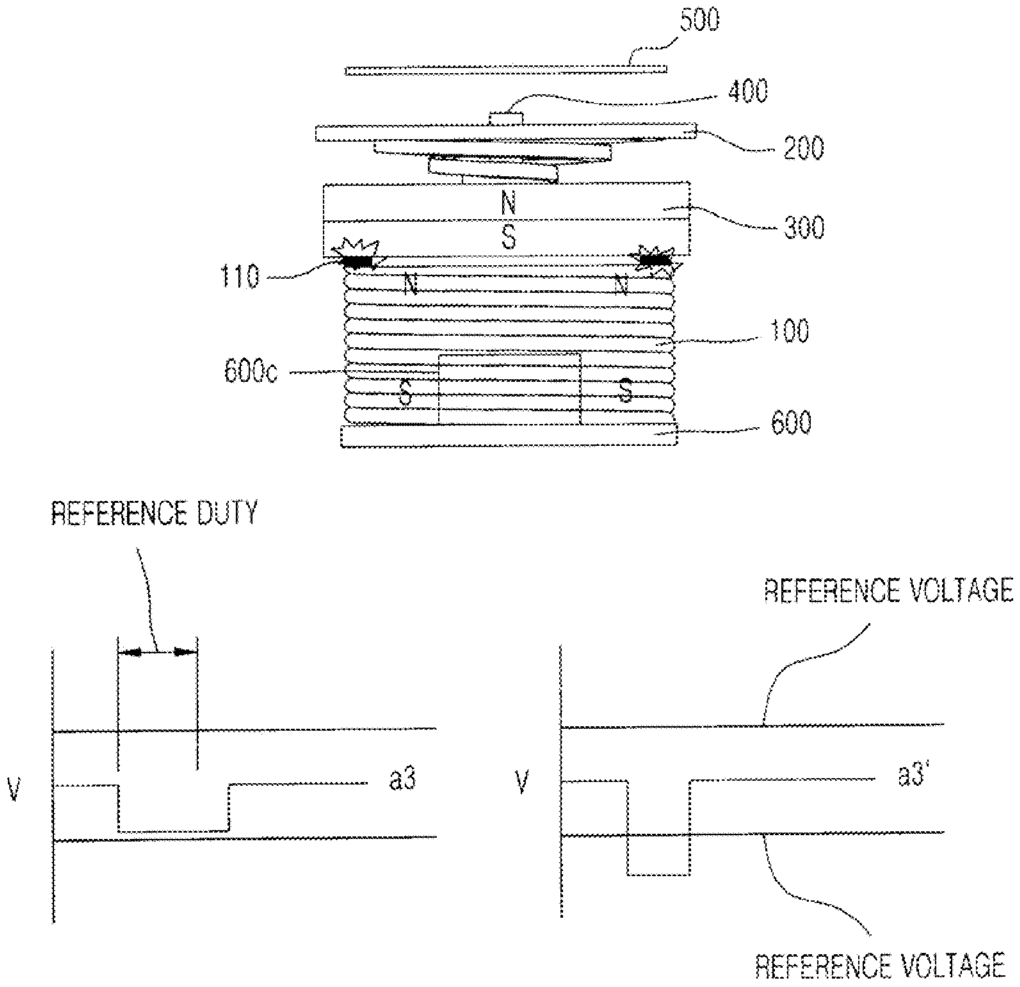

Furthermore, as shown in FIG. 5, periodic electrical energy a3 having a duty higher than the reference value or periodic electrical energy a3' having a voltage higher than the reference value is supplied in a reverse direction, the upper part of the magnetic force generation unit 100 becomes an N pole and the lower part thereof becomes an S pole, so that the permanent magnet 300 is moved to a completed lowered position in which the permanent magnet 300 is in contact with the upper surface of the magnetic force generation unit 100 by attractive force generated in conjunction with the magnetic force generation unit 100.

As described above, when the permanent magnet 300 is moved to the completely lowered position, elastic force is stored in the elastic force provision unit 200, and the elastic force provision unit 200 provides elastic restoring force when the permanent magnet 300 is raised.

Meanwhile, the contactor 400 fastened to one side of the permanent magnet 300 and configured to be selectively raised and lowered along with the permanent magnet 300 as the permanent magnet 300 is moved may be provided, and the impact transmission panel 500 configured to collide with the contactor 400 and generate impact when the permanent magnet 300 is moved to the completely raised position may be provided. Preferably, the impact transmission panel 500 is provided on the external surface of an electronic device so that a user feels vibrations using tactile sensation.

For example, as shown in FIG. 4, the contactor 400 may be vertically fastened to the upper surface of the permanent magnet 300, and the impact transmission panel 500 may be provided such that it is spaced apart from the upper part of the elastic force provision unit 200. Accordingly, when the permanent magnet 300 is moved to the completely raised position, the end of the contactor 400 hits the impact transmission panel 500 and generates impact.

In conclusion, as shown in FIGS. 4 and 5, when the permanent magnet 300 is moved to the completely raised position, the end of the contactor 400 hits the impact transmission panel 500 and generates impact. In contrast, when the permanent magnet 300 is moved to the completely lowered position, the lower surface of the permanent magnet 300 hits the upper surface of the magnetic force generation unit 100 and generates impact. As a result, impact vibrations can be generated.

Preferably, a soundproof limiter 110 is disposed on the upper surface of the magnetic force generation unit 100. Accordingly, when the permanent magnet 300 is moved to the completed lowered position and, therefore, the lower surface of the permanent magnet 300 hits the upper surface of the magnetic force generation unit 100, the generation of noise can be prevented.

Meanwhile, the periodic electrical energy is a signal in which periodic electrical energy having a voltage higher than a reference value is alternatively supplied in a forward direction and in a reverse direction. It will be apparent that the periodic electrical energy may be formed of electrical energy the polarities of which alternate with each other. When the periodic electrical energy is formed of electrical energy the polarities of which alternate with each other, the vibrations of the permanent magnet 300 can be further enhanced.

The inertial vibrations of the permanent magnet 300 will be described below.

Figure 6:
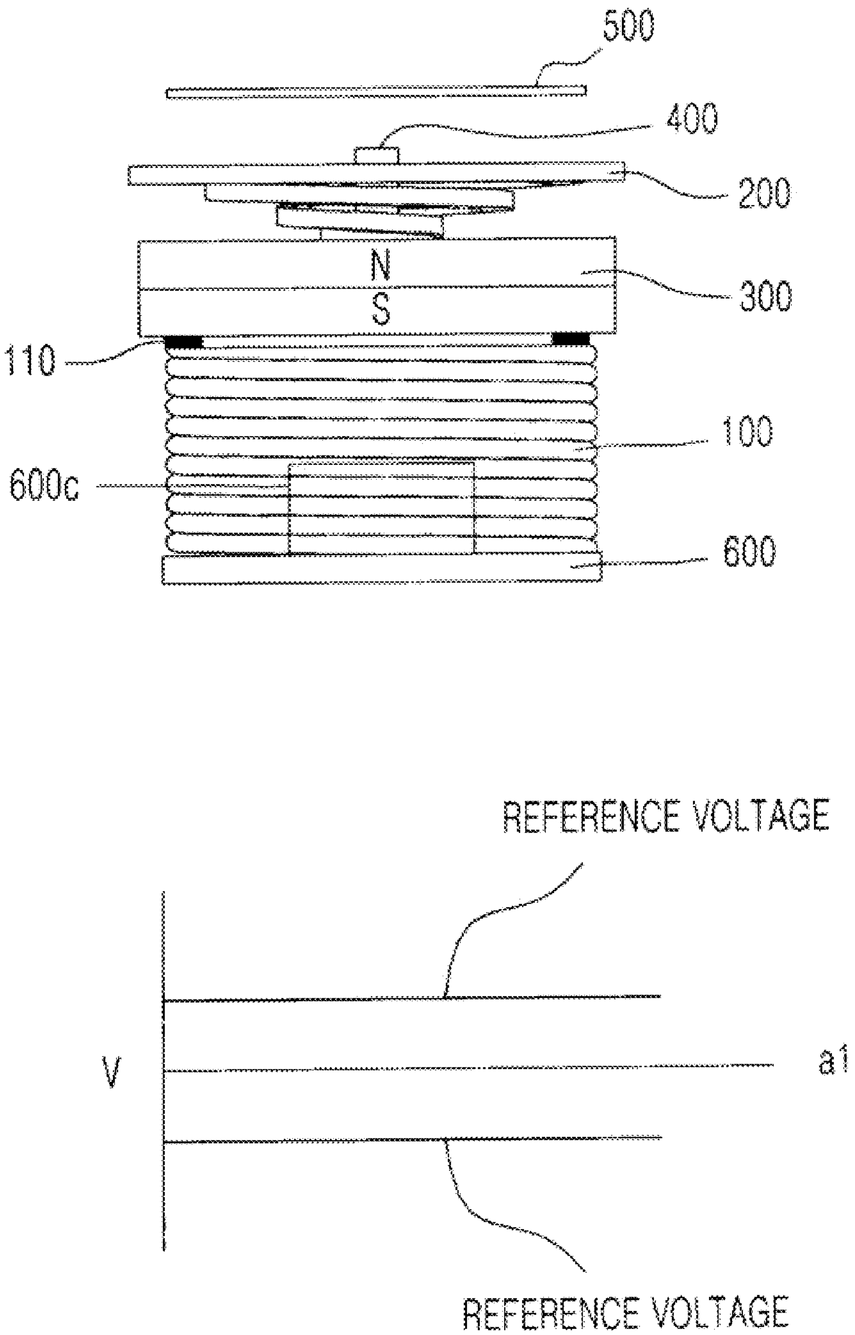
FIGS. 6 to 8 are diagrams illustrating the generation of inertial vibrations by the vibration generation module capable of generating inertial and impact vibrations according to the embodiment of the present invention.

As shown in FIG. 6, in the case where the permanent magnet 300 is in contact with or near the upper surface of the magnetic force generation unit 100, and when a periodic electrical energy having a duty or a voltage lower than the reference value is supplied to the magnetic force generation unit 100, the permanent magnet 300 alternates between a partially raised position in which the permanent magnet 300 is partially spaced from the magnetic force generation unit 100 and a partially lowered position in which the permanent magnet 300 is close to the upper surface of the magnetic force generation unit 100, thereby generating inertial vibrations.

Figure 7:
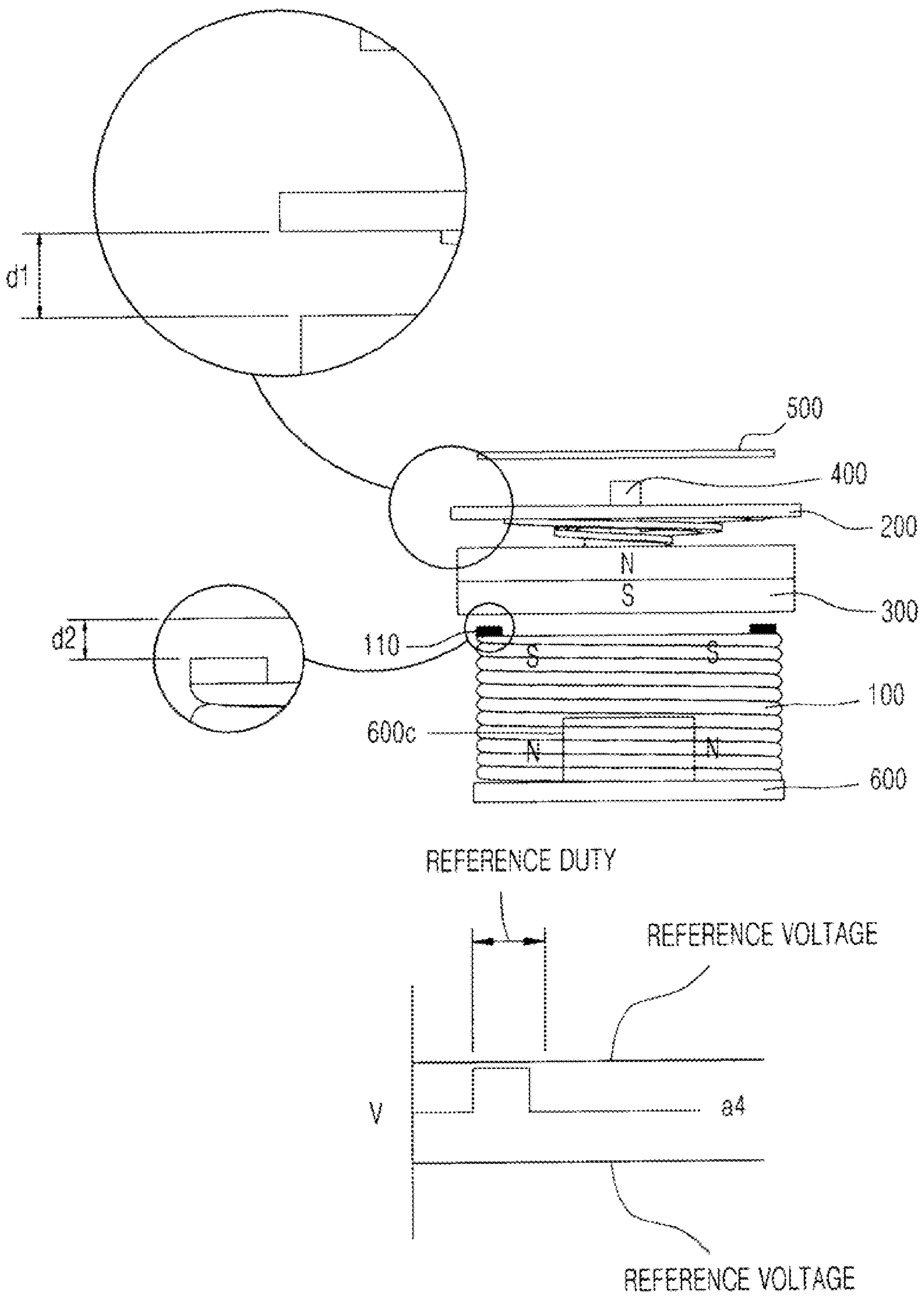

That is, as shown in FIG. 7, when periodic electrical energy a4 having a duty or voltage lower than the reference value is supplied in a forward direction, the upper part of the magnetic force generation unit 100 becomes an S pole and the lower part thereof becomes an N pole, with the result that the permanent magnet 300 is moved and raised to the partially raised position in which the permanent magnet 300 is partially spaced from the magnetic force generation unit 100 by repulsive force generated in conjunction with the magnetic force generation unit 100 and elastic restoring force generated by the elastic force provision unit 200. In detail, the distance between the elastic force provision unit 200 and the upper surface of the permanent magnet 300 is "d1," while the distance between the lower surface of the permanent magnet 300 and the soundproof limiter 110 is "d2."

In this case, since the magnetic force generation unit 100 is supplied with periodic electrical energy having a duty or voltage lower than a reference value, repulsive force generated in conjunction with the permanent magnet 300 is weaker than that for the completely raised position.

Figure 8:
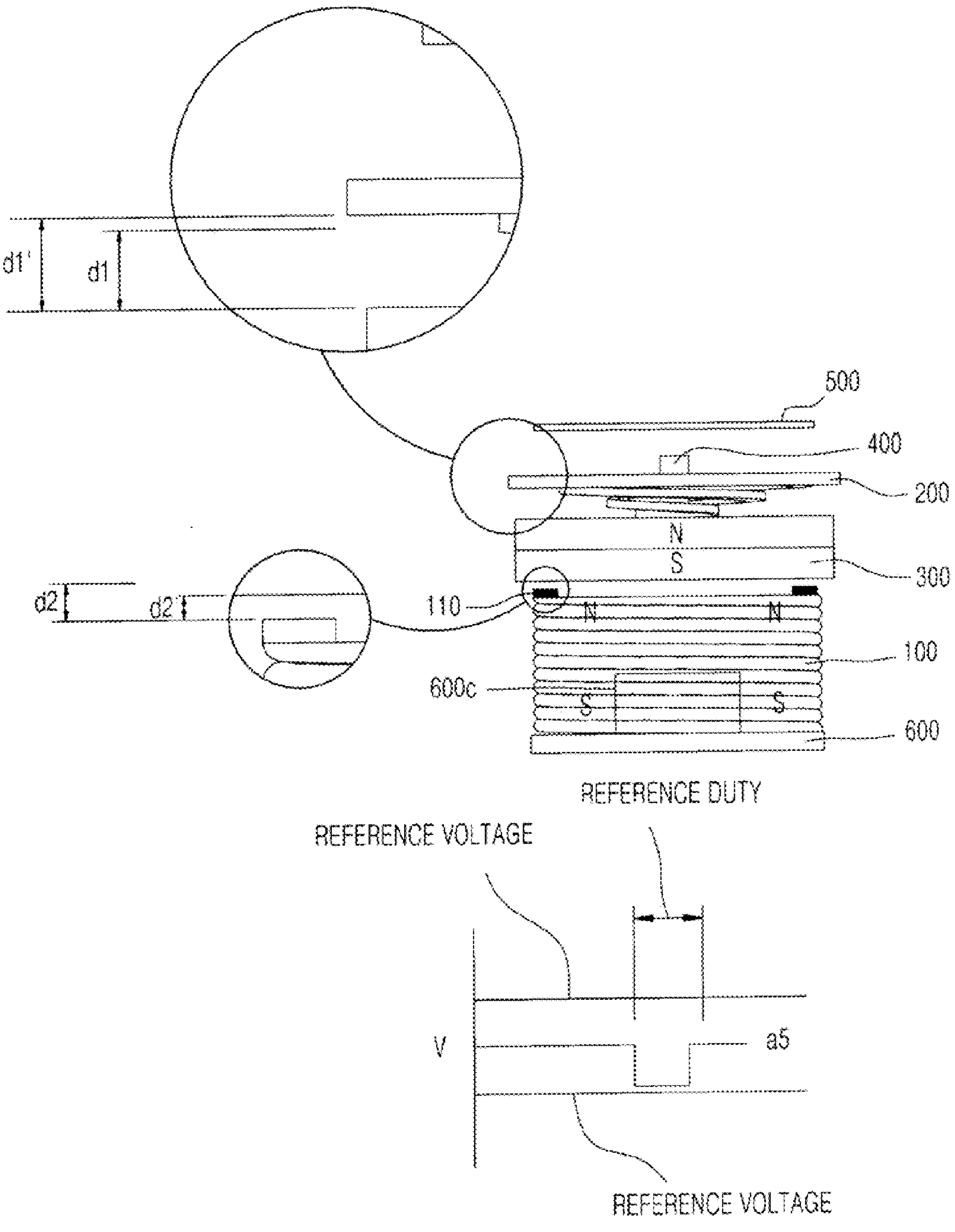

After the movement of the permanent magnet 300 to the above-described partially raised position, as shown in FIG. 8, when periodic electrical energy a5 having a duty or voltage lower than a reference value is supplied in a reverse direction, the upper part of the magnetic force generation unit 100 becomes an N pole and the lower part thereof becomes an S pole, with the result that the permanent magnet 300 is moved to a partially lowered position in which the permanent magnet 300 is close to the upper surface of the magnetic force generation unit 100 by attractive force generated in conjunction with the magnetic force generation unit 100. In detail, the distance between the elastic force provision unit 200 and the upper surface of the permanent magnet 300 is "d1'" which is longer than "d1," while the distance between the lower surface of the permanent magnet 300 and the limiter 110 is "d2'" which is shorter than "d2."

In this case, since the magnetic force generation unit 100 is supplied with periodic electrical energy having a duty or voltage lower than a reference value, the attractive force generated in conjunction with the permanent magnet 300 is weaker than that for the completely raised position.

As described above, when the permanent magnet 300 is moved to a partially lowered position, elastic force is stored in the elastic force provision unit 200, and the elastic force provision unit 200 provides elastic restoring force when the permanent magnet 300 is raised next.

In conclusion, as shown in FIGS. 7 and 8, when the permanent magnet 300 is moved to the partially raised position, the end of the contactor 400 does not hit the impact transmission panel 500. In contrast, when the permanent magnet 300 is moved to the partially lowered position, the lower surface of the permanent magnet 300 does not hit the upper surface of the magnetic force generation unit 100. As a result, inertial vibrations are generated by the own weight of the permanent magnet 300.

Meanwhile, the periodic electrical energy is a signal in which periodic electrical energy having a voltage lower than a reference value is alternatively supplied in a forward direction and in a reverse direction. It will be apparent that the periodic electrical energy may be formed of electrical energy the polarities of which alternate with each other. When the periodic electrical energy is formed of electrical energy the polarities of which alternate with each other, the vibrations of the permanent magnet 300 can be further enhanced.

The base plate 600 is made of magnetic material. When the magnetic force generation unit 100 is formed of a bobbinless solenoid coil, the base plate 600 may be disposed on the lower surface of the bobbinless solenoid coil 100. As the base plate 600 is disposed on the lower surface of the magnetic force generation unit 100, the attractive force generated in conjunction with the permanent magnet 300 can be further enhanced.

Furthermore, the base plate 600 may be provided on the upper surface thereof with the magnetic core 600*c* which protrudes inside the bobbinless solenoid coil 100. Since the magnetic core 600*c* is provided on the upper surface of the base plate 600, the distance to the permanent magnet 300 is further shortened, thereby further increasing attractive force.

As described above, the present invention has an advantage in that impact vibrations can be generated by supplying periodic electrical energy having a duty or voltage lower than a reference value to the magnetic force generation unit, and inertial vibrations can be generated by supplying periodic electrical energy having a duty or voltage lower than a reference value to the magnetic force generation unit, thereby generating a variety of types of vibrations.

Furthermore, the present invention has advantages in that response speed is fast, the attenuation of vibrations is fast, and neat and smooth vibrations can be generated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vibration generation module capable of generating inertial and impact vibrations, comprising:

a magnetic force generation unit made of magnetic material to generate magnetic force when electrical energy is supplied from an external source;

an elastic force provision unit fixedly mounted above the magnetic force generation unit, and configured to provide elastic force in a vertical direction;

a permanent magnet coupled to the elastic force provision unit, and configured such that when electrical energy is not supplied to the magnetic force generation unit, the permanent magnet is lowered to a position in contact with or near an upper surface of the magnetic force generation unit by its own magnetic force, so that the elastic force provision unit enters a state of holding elastic restoring force, such that when periodic electrical energy having a duty or voltage higher than a reference value is supplied to the magnetic force generation unit, the permanent magnet alternates between a position in which the permanent magnet is completely spaced apart from the magnetic force generation unit and a completely lowered position in which the permanent magnet collides with an upper surface of the magnetic force generation unit, thereby generating impact vibrations, and such that periodic electrical energy having a duty or voltage lower than a reference value is supplied to the magnetic force generation unit, the permanent magnet alternates between a position in which the permanent magnet is partially spaced apart from the magnetic force generation unit and a partially lowered position in which the permanent magnet is close to the upper surface of the magnetic force generation unit, thereby generating inertial vibrations;

a contactor fastened to one side of the permanent magnet, and configured to be selectively raised and lowered as the permanent magnet is moved; and an impact transmission panel configured to collide with a front end of the contactor and generate impact when the permanent magnet is moved to the completely raised position.

2. The vibration generation module as set forth in claim 1, wherein the magnetic force generation unit is formed of a bobbinless solenoid coil, and a base plate made of magnetic material is disposed on a lower surface of the bobbinless solenoid coil.

3. The vibration generation module as set forth in claim 2, wherein the base plate is provided on an upper surface thereof with a magnetic core which protrudes inside the bobbinless solenoid coil.

4. The vibration generation module as set forth in claim 1, wherein the elastic force provision unit is formed of a plate shape, and has a fastening hole configured to be tightly fitted around the contactor and a slot provided around the fastening hole and configured to be elastically deformed.

5. The vibration generation module as set forth in claim 1, wherein the impact transmission panel is provided on an outside surface of an electronic device.

6. The vibration generation module as set forth in claim 1, wherein the magnetic force generation unit is formed of a solenoid coil.

7. The vibration generation module as set forth in claim 1, wherein the magnetic force generation unit is provided on an upper surface thereof with a soundproof limiter.

8. The vibration generation module as set forth in claim 1, wherein the periodic electrical energy is electrical energy the polarities of which alternate with each other.

* * * * *